Patented Sept. 1, 1925.

1,551,573

UNITED STATES PATENT OFFICE.

WILLIAM HOFFMAN KOBBÉ, OF NEW YORK, N. Y., ASSIGNOR TO TEXAS GULF SULPHUR COMPANY, OF BAY CITY, TEXAS, A CORPORATION OF TEXAS.

SULPHUR-CONTAINING COMPOSITION AND METHOD OF MAKING THE SAME.

No Drawing. Application filed June 30, 1922. Serial No. 572,037.

*To all whom it may concern:*

Be it known that I, WILLIAM HOFFMAN KOBBÉ, a citizen of the United States, residing at New York city, in the county of New York, State of New York, have invented certain new and useful Improvements in Sulphur-Containing Compositions and Methods of Making the Same; and I do hereby declare the following to be a full, clear, and exact description of the invention, such as will enable others skilled in the art to which it appertains to make and use the same.

This invention relates to sulphur-containing compositions, and has for its object the provision of an improved sulphur-containing composition and method of making the same.

More particularly, the invention relates to an improved sulphur-containing composition comprising a cellular material, such, for example, as diatomaceous or infusorial earth (also known as kieselguhr) and sulphur. Cellular materials of this character are extremely poor conductors, both of heat and electricity. They are, therefore, good insulators. However, certain of their physical properties make them undesirable or unavailable for many uses. For instance, they are apt to be relatively soft. Many times their surfaces may be scratched with the fingernail. They are also hygroscopic and therefore possess an affinity for water which is undesirable in many instances.

Sulphur also is an extremely poor conductor of heat and electricity, and is well known to be a good insulator. Ordinary sulphur at the usual temperature is a relatively hard solid but is extremely brittle, and its use alone is therefore limited.

Diatomaceous or infusorial earth is an article of commerce and is widely marketed under the trade names Celite and Sil-O-Cel.

According to the present invention, cellular material, such as a diatomaceous earth, is impregnated with sulphur in such manner that the sulphur thoroughly penetrates and fills the interstices of the cellular material. In this complete filling of the voids or pores of the material the sulphur is distributed evenly and thoroughly throughout the entire cellular structure. Although both the cellular material and sulphur, by themselves, are unadapted for certain uses where a strong and impervious product is essential, nevertheless, the new product resulting from the complete impregnation of cellular material with sulphur is an impervious stonelike product possessing the desirable qualities, physical and chemical, of both sulphur and the cellular material, and in addition other valuable properties.

The improved composition is hard, rocklike in character, not relatively brittle and will take a high polish. Its natural color varies according to the quality of the cellular material and the quality of the sulphur. With a good quality of diatomaceous earth and Louisiana sulphur it is a bluish grey and, when polished, presents a handsome appearance. It is impervious, non-hygroscopic, acid proof, sterile, resistant to bacterial development, and sanitary; and is adapted to a variety of uses.

The fact that cellular material, such as diatomaceous earth, is relatively soft allows of it being readily machined or worked while in its natural state into any desired form, such as bricks, slabs, etc., for industrial purposes. For decorative purposes the cellular material may be carved while in its natural state, into various objects of art for interior decorating. It may also be made into garden art objects as a substitute for terracotta. In each case the objects are afterward petrified, by impregnating with sulphur in accordance with this invention. The possibilities, therefore, of making various objects from this material and then impregnating them with sulphur in accordance with this invention are almost unlimited. In the form of bricks or slabs, for example, the product may be used for the walls and floors of cold storage chambers, refrigerators, or refrigerator cars, laundry tubs, sinks, table tops, floors for industrial works, vats, acid tanks, etc.

In my prior application, Serial No. 529,749, filed January 16, 1922, I have disclosed a compound composed of cellular material in the form of a powder mixed with sulphur and molded into the desired shape. The present invention is directed more particularly to the impregnation with sulphur of objects or bodies of cellular material, such for example as blocks or bricks of diatomaceous earth, these objects having been first made into the shape desired, while the cellular material is still in its natural state.

Because of the fact that the voids or interstices of cellular material, such as diatomaceous earth, are so minute, they being microscopic in size, it is a difficult problem to cause the sulphur to thoroughly penetrate the material so as to obtain a homogeneous distribution of the sulphur within the cellular structure. The air which is contained within the voids must be driven out and displaced by the sulphur to the very center of the block, or other object which it is desired to impregnate. Inasmuch as molten sulphur does not at first appear to wet diatomaceous earth the result which I have obtained was quite unforseeable and in fact was reached only by patient and painstaking investigation. However, in objects of limited size, I have discovered that the impregnation can be done satisfactorily by submerging the objects in molten sulphur, as is about to be described, but with larger pieces of cellular material it is preferable to proceed in a manner which will be described later on.

When relatively small objects of cellular material are to be impregnated with sulphur they may be introduced, either with or without preheating, into a bath of molten sulphur which is preferably at a temperature at which it is a relatively thin liquid. This temperature is in the neighborhood of 120° C. The objects should be completely submerged in the bath, and it will be found necessary to provide means for holding them below the surface of the molten sulphur since they are extremely light and will tend to float on the top of the molten sulphur. The temperature of the bath should now be raised as high as practicable, say until the sulphur becomes viscous, which is at a temperature of approximately 220° C. This causes the heat of the bath to penetrate well into the objects. After the air has been thoroughly expelled, as can be observed by the reduction in the amount of air bubbles coming to the surface of the bath, its temperature may be allowed to fall until the sulphur again reaches the thin stage so that it may more easily enter the voids of the cellular material. In from 12 to 24 hours the impregnation will be complete, this being determined by the fact that the air bubbles entirely cease forming on the surface of the bath and by the fact that impregnated bodies of cellular material will barely float in the molten sulphur. During this soaking period, it may also be found advantageous to occasionally raise the temperature of the bath temporarily as this seems to aid in the impregnation.

In the case of objects or bodies of cellular material of relatively large size the simple immersion in the molten sulphur bath may not be sufficient to cause the sulphur to penetrate to the center of the material and it is necessary to use a supplemental agency to expel the air from the voids of the material and drive in the molten sulphur. This may be accomplished by immersing the objects of cellular material, such as diatomaceous earth, in water until they are completely saturated, and, owing to the large amount of water which they will absorb, this sometimes requires a period of 12 hours or more. Hot water, however, appears to hasten the absorption somewhat. Other liquids than water may be used provided they vaporize at a lower temperature than that at which sulphur melts. Examples of such liquids are kerosene, or other petroleum oils, methyl alcohol, carbon tetrachloride and benzol. After the objects have been thus completely saturated with water, or other liquid, they are submerged in molten sulphur in the same manner as described above in the case of the impregnation of the dry objects of relatively small size. During this step of the process the water, or other liquid, will be driven off in the form of steam or vapor, and the success of the process is attributed to the formation of a partial vacuum within the minute pores and channels of the diatomaceous earth, or other form of cellular material, which causes a reduction in pressure within the material and a consequent inflow of the molten sulphur so that these pores and channels are completely filled with it.

Another method by which relatively large objects of cellular material may be impregnated with sulphur consists in withdrawing the air from the interstices of the cellular material in a vacuum chamber and then submerging the objects in molten sulphur before atmospheric pressure is restored.

As an indication of the completeness of impregnation it may be mentioned that the new product, made in accordance with my invention, contains from 71% to 75%, by weight, of sulphur.

Referring to the use of my product for making objects of art, it is desirable that these may be suitably colored. This may be accomplished by saturating the dry cellular material with a solution of a salt with which sulphur will react. The material may be allowed to dry and then be impregnated by immersion in molten sulphur, or the solution may be used in place of water alone or the other liquids mentioned in the description above of the method of impregnating relatively large objects. As an example of a suitable salt for the purpose of coloring I mention copper chloride which gives a dark, rich brown color to the finished article.

In connection with the use of my product as a heat insulator it is well recognized by those commercially interested in the operation or manufacture of cold storage plants, refrigerators, refrigerator cars, etc. that the insulation of their walls should be made as complete as consistent with the proper relation between the first cost of the plant and its operating cost. The insulating materials which are at present in common use such as shavings, sawdust, cork, etc., are all objectionable for one reason or another. Therefore, the production of a new insulating material which possesses extremely high insulating properties and at the same time is waterproof, wet resistant and acid proof, and which can also be manufactured at a reasonable cost will create a large demand. The material of this invention possesses these properties and its application in this field alone is an extremely useful one. Sulphur impregnated bricks are a very convenient form in which the material may be used for this purpose. The walls and floors of such cold storage chambers may be very advantageously made of these bricks which may be held together by means of ordinary mortar or, preferably, by means of a sulphur cement such as is disclosed in my prior application above mentioned.

I claim:

1. An object of diatomaceous earth impregnated with sulphur.

2. A block of natural diatomaceous earth impregnated with sulphur.

3. The method of impregnating an object of cellular material with sulphur which comprises, introducing the object into a molten sulphur bath, raising the temperature thereof until the bath reaches the viscous stage, allowing it to cool until the sulphur becomes a thin liquid, and maintaining the bath in this state until the impregnation is complete.

4. The method of impregnating an object of cellular material with sulphur which comprises, introducing the object into a molten sulphur bath, raising the temperature thereof until the bath becomes viscous, allowing it to cool until the sulphur becomes a thin liquid, and maintaining the object submerged in the bath until the impregnation is complete.

5. The method of impregnating an object of cellular material with sulphur which comprises introducing the object into molten sulphur, raising the temperature thereof until the sulphur becomes viscous, allowing the temperature to fall until the sulphur is again liquid and repeating this temperature cycle until the impregnation is complete.

6. The method of impregnating an object of cellular material with sulphur which comprises, introducing the object into a molten sulphur bath, raising the temperature thereof until the bath approaches the viscous stage, allowing it to cool until the sulphur becomes a thin liquid and maintaining the bath in this state until the impregnation is complete.

In testimony whereof I affix my signature.

WILLIAM HOFFMAN KOBBÉ.